US012669000B2

(12) United States Patent
Fuchs et al.

(10) Patent No.: US 12,669,000 B2
(45) Date of Patent: Jun. 30, 2026

(54) METHOD AND APPARATUS FOR MOUNTING A MOTOR VEHICLE COMPONENT

(71) Applicant: KIEKERT AKTIENGESELLSCHAFT, Heiligenhaus (DE)

(72) Inventors: Carsten Fuchs, Essen (DE); Armin Handke, Duisburg (DE); Matthias Ochtrop, Dorsten (DE); Andreas Sohlbach, Mülheim (DE)

(73) Assignee: KIEKERT AKTIENGESELLSCHAFT, Heiligenhaus (DE)

( * ) Notice: Subject to any disclaimer, the term of this patent is extended or adjusted under 35 U.S.C. 154(b) by 197 days.

(21) Appl. No.: 18/262,996

(22) PCT Filed: Jan. 13, 2022

(86) PCT No.: PCT/DE2022/100023
§ 371 (c)(1),
(2) Date: Jul. 26, 2023

(87) PCT Pub. No.: WO2022/167029
PCT Pub. Date: Aug. 11, 2022

(65) Prior Publication Data
US 2024/0093539 A1    Mar. 21, 2024

(30) Foreign Application Priority Data

Feb. 4, 2021    (DE) ..................... 10 2021 102 556.7

(51) Int. Cl.
| | |
|---|---|
| E05B 85/02 | (2014.01) |
| B62D 65/06 | (2006.01) |
| E05B 77/34 | (2014.01) |

(52) U.S. Cl.
CPC .............. E05B 85/02 (2013.01); B62D 65/06 (2013.01); E05B 77/34 (2013.01)

(58) Field of Classification Search
CPC .......... E05B 85/02; E05B 77/34; B62D 65/06
(Continued)

(56) References Cited

U.S. PATENT DOCUMENTS

| | | | | |
|---|---|---|---|---|
| 4,998,332 A | * | 3/1991 | Dacey, Jr. ............ | B62D 25/163 29/90.01 |
| 10,407,950 B2 | * | 9/2019 | Akahori .................. | E05B 77/34 |

(Continued)

FOREIGN PATENT DOCUMENTS

| | | |
|---|---|---|
| CN | 101018614 A | 8/2007 |
| CN | 111565905 A | 8/2020 |

(Continued)

OTHER PUBLICATIONS

International Search Report mailed Apr. 21, 2022, for priority International Application No. PCT/DE2022/100023.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A plastic housing for a motor vehicle component and to a method for mounting a motor vehicle component having a plastic housing, a housing opening closed by at least one plastic film and a mechanism arranged in an interior of the housing, in which the mechanism is mounted, the housing is then closed and the mechanism is subsequently actuated through the housing opening, and in which the housing opening is sealed again after the actuation.

13 Claims, 2 Drawing Sheets

(58) Field of Classification Search
USPC ......................................................... 292/337
See application file for complete search history.

(56) References Cited

U.S. PATENT DOCUMENTS

| | | | |
|---|---|---|---|
| 2013/0199103 A1* | 8/2013 | Raschegewski | E05B 85/02 |
| | | | 118/58 |
| 2020/0157858 A1* | 5/2020 | Iwata | E05B 77/34 |

FOREIGN PATENT DOCUMENTS

| | | | | |
|---|---|---|---|---|
| DE | 4437242 C1 * | 12/1995 | ........... | E05B 17/181 |
| DE | 19851396 A1 | 5/2000 | | |
| DE | 20312347 U1 * | 10/2003 | ............. | E05B 81/90 |
| DE | 10305688 A1 * | 11/2004 | ......... | B29C 37/0032 |
| DE | 102004005677 A1 * | 8/2005 | ........... | E05B 17/188 |
| DE | 102010032744 A1 | 2/2012 | | |
| DE | 102013007403 A1 * | 10/2014 | ......... | E05B 15/1635 |
| DE | 102017123256 A1 | 4/2019 | | |
| EP | 3141369 A1 | 3/2017 | | |
| JP | 2020084446 A | 6/2020 | | |
| WO | WO-2022207034 A1 * | 10/2022 | ............. | E05B 81/06 |

* cited by examiner

METHOD AND APPARATUS FOR MOUNTING A MOTOR VEHICLE COMPONENT

This application is a national phase of International Patent Application No. PCT/DE2022/100023 filed Jan. 13, 2022, which claims priority to German Patent Application No. 10 2021 102 556.7 filed Feb. 4, 2021, each of which is hereby incorporated herein by reference in its entirety.

FIELD OF DISCLOSURE

The invention relates to a method for mounting a motor vehicle component having a plastic housing, a housing opening closed by at least one plastic film and a mechanism arranged in an interior of the housing, in which the mechanism is mounted, subsequently the housing is sealed and finally the mechanism is actuated through the housing opening.

BACKGROUND OF DISCLOSURE

For operating, locking and/or actuating a motor vehicle, components are used that can perform a variety of functions. For example, motor vehicle locks are used as components that hold components arranged movably on the motor vehicle in a secured position. Locks can be used, for example, to secure a charging plug of an electric vehicle. Components are used as drives in sliding door operators, for example. What all these motor vehicle components have in common is that they have a mechanism that can usually be actuated by means of an electric drive. These mechanisms are enclosed in a plastic housing to protect the mechanism and/or the electric motors from dust, moisture and/or contamination. Plastic housings are also used because they are dimensionally stable and easy to adapt to the installation space.

Since motor vehicle components can perform multiple functions and these functions must be tested, for example, prior to series production, the mechanism may have to be operated in inaccessible regions after the housing has been sealed.

By way of example, reference can be made to DE 198 51 396 A1, from which an electrically operable vehicle lock has become known and in whose housing a preformed mounting opening is integrated. A mounting opening is provided on both housing parts, which is covered with a thin layer of material.

An emergency locking device for a motor vehicle door latch has become known from DE 203 12 347 U1, with a housing and at least one locking lever in the housing, wherein the locking lever can be moved manually into a locking position by means of a manipulation tool. The housing has a housing opening that can be temporarily closed by means of a cover for inserting the manipulation tool. Even when the cover is punctured, protection against moisture and contamination is ensured because the cover is usually made of a plastic membrane. This plastic ensures that even a slit left by the manipulation tool is almost closed again after removing the same.

DE 10 2017 123 256 A1 also discloses a motor vehicle lock with an emergency actuation function. For emergency operation of the lock, emergency locking of the motor vehicle lock can be performed by means of an actuating element, for example a wrench or an ignition key. For this purpose, an opening is provided in the lock housing, wherein the opening is closed by a film, for example a plastic film, which is pierced by means of the actuating element.

The solutions known from the prior art for the subsequent actuation of a motor vehicle component have proven themselves in principle, but reach their limits when maximum protection against moisture and penetrating contamination is to be ensured and, at the same time, complex manual locking systems are to be dispensed with. This is where the invention starts from.

SUMMARY OF DISCLOSURE

The object of the invention is to provide a method for mounting a motor vehicle component and an apparatus for closing the mounting opening in a safe manner that can be easily integrated into the manufacturing process. In addition, a structurally simple and cost-effective solution for closing the mounting opening is to be provided.

This object is solved in process engineering terms by the features of claims 1 to 7 and in device engineering terms by claims 8 to 10. Advantageous embodiments of the invention are specified in the dependent claims. It should be noted that the embodiments described below are not restrictive; rather, any variation of the features described in the description and the dependent claims is possible.

In accordance with claim 1, the object of the invention is solved by providing a method for mounting a motor vehicle component comprising a plastic housing, a housing opening closed by at least one plastic film, and a mechanism disposed in an interior of the housing, wherein the mechanism is mounted, subsequently the housing is closed, and finally the mechanism is actuated through the housing opening, and wherein the housing opening is closed again after actuation of the mechanism. The method for mounting a motor vehicle component according to the invention now makes it possible to provide a safe method for completely closing the mounting opening that is particularly easy to integrate into the manufacturing process. After the housing opening, which is closed by means of a plastic film, has been pierced by the mounting means at least in some areas, an opening is present which is accessible to dust and/or moisture and/or contamination. The method step of resealing the penetration in the plastic film according to the invention can ensure complete closure of the mounting opening. Re-sealing the housing opening in this case allows the mechanism inside the motor vehicle component to be safely protected from moisture ingress or contamination for the life of the motor vehicle component.

In this way, the advantages obtained by inserting the plastic film in the region of the housing opening are complemented by the subsequent sealing. The plastic film, which is still present in some areas and moves elastically back to its original position in some areas, can serve as a basis for closing the housing opening. In contrast to a completely open housing opening, the housing opening only has to be partially closed again, as the plastic film still closes the mounting opening in some areas. The presence of the plastic film also ensures optimal bonding between the plastic film and the housing, since the plastic film can be formed integrally with the housing. Thus, only the tear opening made in the plastic film by the mounting tool has to be closed again.

Motor vehicle components are those components in the housing that contain a mechanism that must be subsequently actuated or subjected to a tool inside the housing for mounting or testing purposes. Motor vehicle components can be locking systems, drive systems, latch systems, adjustment systems, etc., to list just a few by way of example. All vehicle components have in common that they have a plastic housing, in which at least one housing opening is provided, which is closed with a plastic film, preferably in one piece with a plastic film. In addition to inserting a plastic film into the mounting opening, however, it is also possible to arrange a separate closure means, such as a sticker or adhesive strip, in the region of the housing opening. It is also conceivable that a separate sealing plug is arranged in the region of the housing opening, which is then pierced by the mounting tool.

The method according to the invention assumes that a mechanism is arranged in the interior of the housing, and the mechanism can be actuated, stabilized and/or fixed through the housing opening. After inserting the mechanism, the housing is closed, or at least the housing is inaccessible to the extent that the mounting tool can be reached through the mounting opening. It is also conceivable that only a partial mounting of the vehicle component has been carried out, and the mechanism mounted in the housing is pressurized through the mounting opening. Thus, the mounting opening can also serve as an mounting aid during the production of the motor vehicle component. For example, the motor vehicle component may have a housing part into which one or more components of a mechanism are inserted, and subsequently a mounting tool is pushed thereto through the housing part to fix and/or position and/or actuate a mounted mechanism component. Subsequently, another mechanism and/or housing part can be mounted to completely close the housing. The method according to the invention thus also comprises the method in which the mounting tool is first passed through the housing opening and the housing is then closed. In any case, the mounted motor vehicle component must be finally sealed in the region of the pierced plastic film in accordance with the invention.

In a further embodiment of the method, testing and/or final mounting of the motor vehicle component is made possible by means of the actuation of the mechanism. After mounting the mechanism in at least a portion of the motor vehicle component housing, a manipulation tool may be inserted into the housing opening. The manipulation tool is then able to actuate a portion of the mechanism by, for example, moving a lever, locking it in movement, and/or displacing it. According to the invention, actuation of the mechanism is accompanied by a test step and/or further mounting. Consequently, by means of reaching through the housing opening, after mounting at least a portion of the mechanism, the mechanism can be actuated through the portion of the housing provided with the housing opening. The test can be, for example, a functional test that tests a lock or an inertia lock on a motor vehicle lock. However, it is also conceivable that, for example, a spring element in the motor vehicle component is held in a position by means of the manipulation tool so that a component acted upon by the spring can be mounted more easily. These are just a few examples to illustrate the advantageous possibilities offered by access through the housing opening.

If, in a further method step, the plastic film is cut in by means of an actuating tool or a manipulation tool, this results in an advantageous design variant of the method. If the plastic film is cut once, twice or several times during the insertion of the actuating tool, a defined separation point can be created in the plastic film. In particular, if the actuating tool is to prevent pivoting with respect to the mechanism, for example, the tip of the actuating tool may have a cutting edge that makes a defined cut in the plastic film. The incision can be selected so that the plastic film can close again as easily as possible when the manipulation tool is moved out of the housing opening. Thus, in an advantageous manner, the actuating tool can contribute to the resealing of the housing opening. The actuating tool can thus also be regarded as an actuating and cutting tool.

In an advantageous manner, the housing opening can be closed in the course of the closing process after actuation by means of a mounting foam. When the mounting tool is pulled out of the housing opening, the plastic film closes the housing opening again, at least in some areas. The elasticity of the plastic and/or the thickness of the plastic film can be used to adjust the resealing process in a defined manner. The thickness of the plastic film must be selected in such a way that, on the one hand, the housing film can be easily pierced and, on the other hand, sufficient stability of the cut plastic film can be ensured. The housing opening is thus closed again, at least in some areas. If a mounting foam is now applied to the housing opening and in particular the plastic film in a subsequent method step, the housing opening can be completely and securely closed again. The housing is then tightly and completely sealed again in the region of the housing opening. The plastic film serves as a support for the mounting foam applied. By applying a mounting foam, a method step that can be easily integrated into the manufacturing process can be added to achieve a final sealing housing. The application of the mounting foam is particularly advantageous if other regions of the motor vehicle component housing are also covered with a mounting foam.

If the mounting foam is applied as a foam around the housing opening, a further advantageous variant of the method can be achieved. The incised plastic film in the region of the housing opening has elasticity depending on the number of cut surfaces. In order to be able to reliably reseal the housing opening after cutting, the foam bead is applied circumferentially to the housing opening in accordance with the invention. The foam bead is applied around the circumference in such a way that it overlaps the center of the housing opening, so that the incised plastic film can be securely sealed.

Applying the foam bead to the periphery of the housing opening can additionally stabilize the foam bead, since the foam bead is supported on the housing edge on the one hand and extends only in some areas in the direction of the incision in the housing film on the other. However, the mounting foam extends so far in the direction of the housing opening that the foam bead overlaps at least in the center of the housing opening. This ensures that the plastic film in the region of the center of the housing opening is subjected to minimal stress during application. It is also conceivable that the mounting foam is applied in several partial steps, for example a foam bead can be applied along the edge of the housing opening and subsequently, in a further method step, applied centrally, i.e., in the middle of the housing opening. By applying the mounting foam, a complete and secure closure of the housing opening can be achieved. Preferably, the housing opening is designed in a circular shape, but it can of course also be designed in a triangular, square or oval shape, depending on the actuating tool required.

If a surface for applying the mounting foam is treated with a heat source, particularly a laser, prior to application, a further advantageous embodiment of the method according to the invention results. The advantages of heat treating the surface before applying the mounting foam are described in detail in DE 10 2010 032 744 A1. In particular, surface cleaning can be achieved by activating the surface, but primarily the affinity between the mounting foam and the housing material can be increased by means of activating the surface.

It may be further advantageous for the method if a mounting mold in the form of a polyurethane foam is applied. Such polyurethane foams with a soft-elastic to hard-elastic character can have Shore hardnesses from 0 to a maximum of 100, whereas a hard-elastic design leads to Shore D hardnesses of about 50 and more. Preferably, the method according to the invention works with a polyure- thane foam whose Shore hardness is well below 100 and which has a particularly pronounced elastic deformability, preferably a Shore hardness of 50.

In terms of devices, the object of the invention is solved by providing a plastic housing for a motor vehicle compo- nent, wherein the component can be inserted in a region accessible to moisture, having a housing opening closed by at least one plastic film and a mechanism arranged in an interior of the housing, wherein the mechanism can be actuated through the housing opening and wherein the housing opening can be closed after actuation, in particular by means of a foam bead and/or by means of hot stamping. Due to the design of the plastic housing according to the invention, on the one hand, additional actuation of the mechanism can take place after the housing has been mounted at least in some areas, and at the same time, secure sealing and complete closure of the housing can be ensured. The foam bead closes the housing opening opened by means of the tool in such a way that neither moisture nor dust can enter through the housing opening.

In addition to the application of a foam bead, it is also conceivable according to the invention that the housing opening or the plastic film is closed again by means of. The plastic housing of the motor vehicle component is preferably made of a thermoplastic material, so that forming is possible even after the housing has been manufactured. If, after mounting, a hot stamping die is now brought into the region of the housing opening and into contact with the plastic film, the cutting edge can be closed again by means of a forming operation, i.e., hot stamping. Of course, a combined closure of hot stamping and foam bead is also conceivable.

It has proved advantageous if a survey is arranged in the region of the housing opening, at least in certain areas. A survey can provide additional support for the mounting foam and also serve as a positioning lock for the actuating tool. In an advantageous manner, the survey can extend regionally or circumferentially at the housing opening. Preferably, the housing opening is designed to be circular and the survey also surrounds the housing opening in a circular and cir- cumferential manner.

In an advantageous manner, the survey forms a contact surface for the mounting foam and or a material accumula- tion for hot stamping. In this way, the mounting foam is supported at least in some areas, preferably circumferen- tially, and can also be supported on the pierced housing film. This ensures that the mounting foam can be securely applied to the outer surface of the housing without penetrating the interior of the motor vehicle component housing. Particu- larly by applying the mounting foam around the circumfer- ence and supporting it against the survey, the housing opening can be completely and tightly closed again without exerting large loads on the center of the punctured plastic film. The method according to the invention and in particular the plastic housing designed according to the invention thus make it possible, on the one hand, to insert an actuating tool into the housing even after mounting a mechanism and, at the same time, to provide a sealing housing. In particular, the application of the mounting foam provides an easy way of integrating the motor vehicle component into the production process so that it can also be used in damp regions or areas of heavy contamination.

A circumferential or at least regionally circumferential material elevation can support a foam bead in production. If, on the other hand, hot stamping or hot forming is preferred as a method for closing the housing opening, material accumulation in the engagement area of the cutting edges of the actuating tool can be advantageous. The material accu- mulation can also be adapted to the design of the cutting edges, particularly the number of cutting edges. For example, if 3 cutting edges are arranged on the cutting tool or actuating tool, 3 material accumulations arranged around the cutting edges can be provided. Thus, the cutting edges could impact the housing opening or plastic film adjacent to the material buildup, which would facilitate cutting through or piercing the plastic film while providing a sufficient amount of plastic for hot stamping.

BRIEF DESCRIPTION OF DRAWINGS

In the following, the invention is explained in more detail with reference to the appended drawings using an exemplary embodiment. However, the principle applies that the embodiment does not limit the invention but is merely an advantageous embodiment. The features shown can be implemented individually or in combination with further features of the description as well as the claims—individu- ally or in combination.

In the figures.

DETAILED DESCRIPTION

Figures 1, 2, 3, 4:
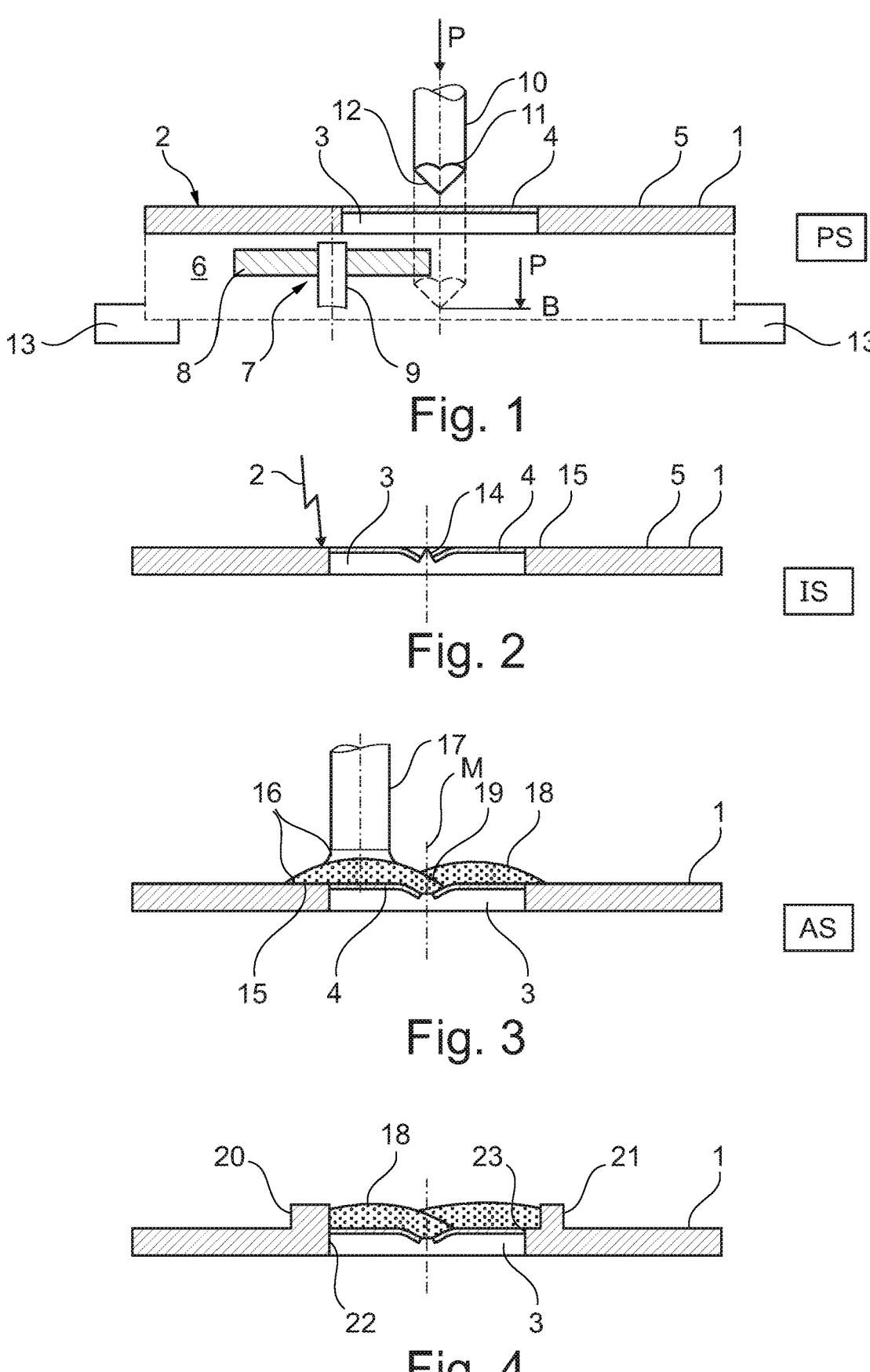
FIG. 1 a cross-section through a plastic housing of a motor vehicle component in the region of a housing opening with a plastic film and a portion of a mechanism and an actuating tool, FIG. 2 the plastic housing in accordance with FIG. 1 after actuation of the mechanism by means of the actuating tool, FIG. 3 the plastic housing in the region of the housing opening, wherein the application of the mounting foam is shown in principle, FIG. 4 Two alternative embodiments of a plastic housing of a motor vehicle component with surveys and applied mounting foam.

FIG. 1 reproduces a section through a plastic housing 1 of a motor vehicle component 2 in the region of a housing opening 3. The housing opening 3 is closed with a plastic film 4, wherein the plastic film 4 in this embodiment example is designed integrally with the plastic housing 1 and wherein the plastic film is flush with a surface 5 of the plastic housing 1. The housing opening 3 can be designed cylin- drically, for example. A mechanism 7 is arranged in an interior 6 of the plastic housing 1, wherein a pivotably mounted lever 8 is reproduced here as an example, which is fastened on a swivel pin 9 as an example. Above the plastic housing 1, an actuating tool 10 is reproduced in sections and in an actuating position with respect to the plastic housing 1. Four cutting edges 12 are provided at an axial end 11 of the actuating tool 10 in this embodiment. The actuating tool 10 is otherwise substantially cylindrical in shape.

FIG. 1 shows the motor vehicle component 2 in an orientation with respect to the actuating tool 10, so that the position of the motor vehicle component 2 in a position in an assembly device 13 is reproduced as an example. A first method step is shown in this respect, namely that the mechanism 7 has already been mounted in the plastic housing and the motor vehicle component 2 is located in the assembly device.

For example, the motor vehicle component 2 may already be fully mounted and is located with the assembly device 13 in a testing station. To test the function of the mechanism 7, the actuating tool 10 is now moved in the direction of the arrow P from the starting position shown in FIG. 1 to the actuating position B, wherein the actuating position B is reproduced as a dashed line in FIG. 1. In the process, the actuating tool 10 pierces the plastic film 4 with the cutting edges 12 in a defined manner. In the operating position B, the actuating tool 10 is now able to limit, for example, a pivoting movement of the lever 8 around the swivel pin 9. Of course, it is also conceivable that the lever 8 is actuated by the actuating tool 10, wherein only an exemplary blocking of the pivoting movement of the mechanism 7 is reproduced here. FIG. 1 thus shows an example of the position of the motor vehicle component 2 in the testing station PS, in which the method steps:

Piercing the plastic film 4,

Actuating the mechanism 7 by means of the actuating tool 10,

Checking the mechanism 7 and

The actuating tool 10 is moved out of the motor vehicle component 2.

FIG. 2 represents the situation in which the motor vehicle component is present after the actuating tool 10 has been moved back out of the plastic housing 1. It can be seen that the plastic film 4 is pierced, wherein a cutting edge 14 can be seen in the plastic film 4. The plastic housing 1 may now have been moved to an ionization station IS. In the ionization station IS, a circumferential region 15 of the housing opening 3 can be heat treated, for example, by means of a laser L. The heat treatment activates the surface 5 in the circumferential area 15 of the housing opening 3, making it possible to produce a higher affinity for a mounting foam 16. In this respect, in FIG. 2 the method step:

Heat treatment of the circumferential area 15 of the housing opening 3 is reproduced. From the ionization station IS, the plastic housing 1 can be transferred to an application station AS, wherein application of the mounting foam 16 can also be performed in a combined station with heat treatment.

FIG. 3 shows the plastic housing 1 in the region of the housing opening 3, wherein the method step:

Application of the mounting foam 16 is reproduced. The injection mold 17 with which the mounting foam 16 is applied to the circumferential area 15 and the plastic film 4 is shown here as an example. It can be seen that the mounting foam 16 is applied such that a foam bead 18 extends from the circumferential area 15 across the plastic film 4 to beyond a midline. An overlap 19 of the foam bead 18 in the region of the centerline M of the housing opening 3 can ensure reliable sealing of the housing opening 3 after the plastic film 4 has been pierced.

FIG. 4 reproduces alternative embodiments of a survey 20, 21 in the region of a housing opening 3. The survey 20 is flush with a through-opening 22 of the housing opening 3, whereas the survey 21 is arranged away from the housing opening 3 by an offset 23. In this respect, FIG. 4 shows the presence of a foam bead 18, wherein the foam bead 18 is supported by the surveys 20, 21. On the one hand, the surveys 20, 21 can serve to align the plastic housing 1 in the assembly device 13, but it is also conceivable that, for example, the actuating tool 10 can be guided through the surveys 20, 21.

Figure 5:
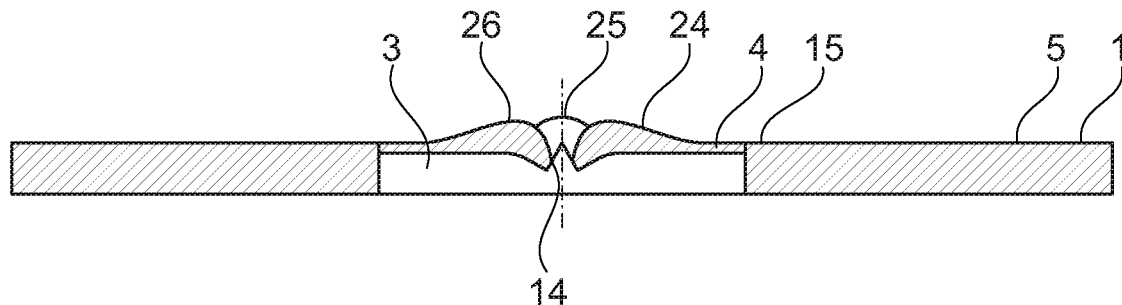
FIG. 5 shows an embodiment of a plastic housing in which the cutting edges are closed again by means of hot stamping.

FIG. 5 reproduces an embodiment of a plastic housing 1 in which the housing opening 3 is closed again by means of hot stamping. Material accumulations 24, 25, 26 are arranged in areas on the plastic film 4. It can be clearly seen that the material accumulations 24, 25, 26 are arranged adjacent to the cutting edges 14 in this embodiment. Of course, a single accumulation of material 24, 25, 26 can also be provided, but this is again less advantageous for the insertion of the mounting tool 10.

The structure of the plastic housing 1 according to the invention and the method steps reproduced in the FIGS. now make it possible to realize a secure closure of a housing opening 3 after a plastic film 4 of a housing opening 3 in a motor vehicle component has been opened or severed. A mounting foam 16 is also used, for example, to seal the motor vehicle component with respect to a vehicle body, so that sealing the housing opening 3 and in particular the plastic film 4 can be easily integrated into the manufacturing process. A cost-effective and simple method for sealing a housing opening is thus available.

LIST OF REFERENCE SIGNS

1 plastic housing
2 motor vehicle component
3 housing opening
4 plastic film
5 surface
6 interior of the plastic housing
7 mechanics
8 lever
9 swivel pin
10 actuating tool
11 axial end
12 cutting edges
13 assembly device
14 cutting edge
15 circumferential area
16 mounting foam
17 injection mold
18 foam bead
19 overlap
20, 21 survey
22 through-opening
23 offset
P arrow
B operating position
L Laser
M midline
PS testing station
IS ionization station
AS application station

The invention claimed is:

1. A method for mounting a motor vehicle component with a plastic housing comprising the steps of:

mounting a mechanism such that the mechanism is arranged in an interior of the housing, subsequently closing a housing opening of the housing by at least one plastic film, actuating the mechanism through the housing opening by piercing the at least one plastic film with an actuating tool, and sealing the piercing in the at least one plastic film by applying a mounting foam to the at least one plastic film at the piercing.

2. The method for mounting according to claim 1, wherein by actuating the mechanism a test and/or a final mounting of the motor vehicle component is enabled.

3. The method for mounting according to claim 1, wherein actuating the mechanism includes piercing the plastic film with an actuating tool and actuating the mechanism with the actuation tool.

4. The method for mounting according to claim 1, wherein the mounting foam is applied as a foam bead around the housing opening.

5. The method for mounting according to claim 1, wherein a surface for applying the mounting foam is treated with a heat source before application.

6. The method for mounting according to claim 1, wherein the mounting foam is applied in the form of a PUR (polyurethane) foam.

7. A plastic housing of a motor vehicle component, wherein the component is inserted in a region of the plastic housing accessible to moisture, comprising:

a housing opening closed by at least one plastic film, and a mechanism arranged in an interior of the housing, wherein the mechanism is actuated through the housing opening by piercing the at least one plastic film with an actuating tool, and wherein the piercing in the at least one plastic film is closed after actuation by a foam bead and/or hot stamping applied to the at least one plastic film at the piercing.

8. The plastic housing according to claim 7, further comprising a survey arranged at least in a region of the housing opening.

9. The plastic housing according to claim 8, wherein the survey forms a contact surface for the mounting foam and/or a material accumulation for hot stamping.

10. The method for mounting according to claim 5, wherein the heat source is a laser.

11. The method for mounting according to claim 3, wherein closing the housing opening again after actuating the mechanism includes resealing the piercing in the plastic film made by the actuating tool.

12. The method for mounting according to claim 4, wherein the foam bead is applied at a periphery of the housing opening and extends sufficiently to overlap a center of the housing opening.

13. The method for mounting according to claim 4, wherein the plastic housing includes at least one survey, and the foam bead is applied at a position supported by the at least one survey.

* * * * *